(12) United States Patent  
Francfort et al.

(10) Patent No.: US 8,484,750 B2
(45) Date of Patent: Jul. 9, 2013

(54) COUPLING OF A COMPUTER PROGRAM OR OF DATA TO A REFERENCE SYSTEM AND ASSOCIATED VERIFICATION

(75) Inventors: Stanislas Francfort, Evrecy (FR); Haythem Gadacha, Paris (FR); Ryad Benadjila, Paris (FR); Alain Nochimowski, Vincennes (FR)

(73) Assignee: France Telecom, Paris (FR)

( * ) Notice: Subject to any disclaimer, the term of this patent is extended or adjusted under 35 U.S.C. 154(b) by 1548 days.

(21) Appl. No.: 12/068,977

(22) Filed: Feb. 13, 2008

(65) Prior Publication Data

US 2009/0205052 A1   Aug. 13, 2009

(30) Foreign Application Priority Data

Feb. 13, 2007   (FR) ...................................... 07 01024

(51) Int. Cl.
   *G06F 7/04*   (2006.01)
(52) U.S. Cl.
   USPC ......................................................... 726/29
(58) Field of Classification Search
   USPC ................. 726/26–30; 380/28; 713/164, 165, 713/193
   See application file for complete search history.

(56) References Cited

U.S. PATENT DOCUMENTS

| | | | | |
|---|---|---|---|---|
| 5,509,070 A | * | 4/1996 | Schull | ............................. 705/54 |
| 7,539,872 B2 | * | 5/2009 | Sion et al. | ..................... 713/176 |
| 2004/0133792 A1 | | 7/2004 | Dublish et al. | |
| 2006/0080464 A1 | | 4/2006 | Kozuki | |
| 2010/0142705 A1 | * | 6/2010 | Reffe | ............................... 380/46 |

FOREIGN PATENT DOCUMENTS

| | | |
|---|---|---|
| EP | 1 455 257 A1 | 9/2004 |
| WO | WO 98/42098 | 9/1998 |
| WO | WO98042098 | * 9/1998 |

OTHER PUBLICATIONS

Federal Information Processing Standards Publication (FIPS) Publication 180-1; "Announcing the Standard for Secure Hash Standard", Apr. 17, 1995, pp. 1-17.

* cited by examiner

*Primary Examiner* — Beemnet Dada
(74) *Attorney, Agent, or Firm* — Knobbe Martens Olson & Bear LLP (57) ABSTRACT

The invention relates to a method of coupling a computer program and/or data to a reference system, implementation of the computer program and/or access to the data being carried out by executing software, a group of parameters being associated with the reference system. The method comprises the protection of a value V0 associated with the reference system and necessary for the execution of said software, in alliance with at least one parameter of said group of parameters. The protection of the value V0 comprises the storage of at least one data pair comprising a function g_i of at least one parameter of said group of parameters and a function h_i of the value V0.

9 Claims, 4 Drawing Sheets

COUPLING OF A COMPUTER PROGRAM OR OF DATA TO A REFERENCE SYSTEM AND ASSOCIATED VERIFICATION

This application claims the benefit of French Patent Application No. 07 01024, filed on Feb. 13, 2007, which is incorporated by reference for all purposes as if fully set forth herein.

BACKGROUND OF THE INVENTION

1. Field of the Invention

The present invention relates to the coupling of a computer program and/or of data to a reference system.

2. Discussion of the Related Art

The implementation of the computer program and/or the fact of accessing the data being carried out by executing software, the invention can therefore also be seen as pertaining to the reserving of the execution of said software for a reference system.

Specifically, rights are generally attached to computer programs and to data, in particular so as to protect their publishers. One may for example think of computer programs aimed at certain applications (office automation, games, software packages, etc.) or of data of audio, video or multimedia type (music, films, etc.).

A user having legitimately acquired a computer program and/or data normally obtains the right to use them for personal purposes, on a reference system that he uses.

On the other hand, it may be desirable that a user furnished with a system other than the reference system of the legitimate user and having acquired a computer program and/or data in an illegitimate manner, for example on a pirate network where they have been distributed, not be able to avail himself thereof in an unrestricted manner.

For this purpose, it is known to couple (or anchor) a computer program and/or data to a reference system, in such a way that the latter cannot be utilized on another system potentially belonging to an illegitimate user.

The task of an attacker wanting to avail himself of this computer program and/or these data is thus rendered more complex, since the attacker must firstly understand and break the scheme for coupling to the reference system.

According to an existing procedure, the coupling is carried out by taking and storing several characteristic parameters of the reference system. These characteristic parameters pertain for example to the configuration of the system.

Before the execution, on a current system, of the software allowing implementation of the computer program and/or access to the data, it is verified whether the characteristic parameters of the current system are identical to those of the reference system.

If they are, it is deduced therefrom that the current system is indeed the legitimate reference system for which the execution of the software is reserved, and the software can then be executed normally.

In the converse case, it is concluded therefrom that the current system differs from the reference system and is therefore illegitimate. The software is then not executed, thus preventing implementation of the computer program and/or access to the data.

This procedure has however the drawback of being quite inflexible, since it effects a permanent coupling to the reference system. If one of the characteristic parameters of the reference system is modified, for example as a consequence of a change of configuration of this system, the software can no longer be executed on the reference system itself, thus preventing its user from implementing the computer program and/or accessing the data that he nevertheless has acquired legitimately.

Another type of coupling is therefore desirable.

SUMMARY OF THE INVENTION

The invention thus proposes a method of coupling a computer program and/or data to a reference system, implementation of the computer program and/or access to the data being carried out by executing software, a group of parameters being associated with the reference system. The method comprises the protection of a value V0 associated with the reference system and necessary for the execution of said software, in alliance with at least one parameter of said group of parameters. The protection of the value V0 comprises the storage of at least one data pair comprising a function g_i of at least one parameter of said group of parameters and a function h_i of the value V0.

The protection of the value V0 allows only the reference system to execute the software. Specifically, an illegitimate system is not capable of overcoming this protection and therefore of obtaining the value V0 necessary for the execution of the software. At the same time, the protected value V0 remains allied with at least one parameter of said group of parameters.

The protection of the value V0 can advantageously comprise the construction and storage of a table comprising, for each element t of a set of subsets of said group of parameters satisfying a predetermined criterion, a data pair (g_t(X); h_t (V0)), where g_i denotes a function dependent on i, h_i denotes an invertible, bijective function dependent on i, and X denotes an element in the defining set of g_t.

Advantageously, the protection of the value V0 is done in alliance with part only of the parameters of said group of parameters. This gives the system flexibility, since a change of certain parameters only of the reference system, for example due to a change of configuration, will not necessarily represent an impediment to the proper execution of the software by this reference system.

Advantageously, the protection of the value V0 is done in alliance solely with subsets of said group of parameters comprising a number of parameters that is greater than a determined value. This makes it possible to control the number of changes of parameters that are authorized.

Advantageously, the value V0 is specific to the reference system, so as to increase the safety against possible attacks.

The invention also proposes a reference system with which a group of parameters is associated and with which a computer program and/or data have to be coupled, implementation of the computer program and/or access to the data being carried out by executing software. The reference system comprises means for protecting a value V0 associated with the reference system and necessary for the execution of said software, in alliance with at least one parameter of said group of parameters. The means for protecting the value V0 comprise means for storing at least one data pair comprising a function g_i of at least one parameter of said group of parameters and a function h_i of the value V0.

The invention furthermore proposes a computer program product comprising instructions able to implement, when it is loaded and executed on computer means, a coupling of a computer program and/or data to a reference system, implementation of the computer program and/or access to the data being carried out by executing software, a group of parameters being associated with the reference system. The coupling comprises the protection of a value V0 associated with the reference system and necessary for the execution of said software, in alliance with at least one parameter of said group of parameters. The protection of the value V0 comprises the storage of at least one data pair comprising a function g_i of at least one parameter of said group of parameters and a function h_i of the value V0.

The invention also proposes method of verifying that a current system with which a second group of parameters is associated is authorized to execute software allowing implementation of a computer program and/or access to data, the computer program and/or the data having been previously coupled to a reference system with which a first group of parameters is associated, by protecting a value V0 associated with the reference system and necessary for the execution of said software, in alliance with at least one parameter of the first group of parameters, the protection of the value V0 comprising the storage of at least one data pair comprising a function g_i of at least one parameter of said group of parameters and a function h_i of the value V0. The method comprises retrieving the value V0 on the basis of at least one parameter of said second group of parameters.

Retrieving the value V0 advantageously comprises retrieving the function h_i of the value V0 on the basis of a function of at least one parameter of said second group of parameters, correlated with the function g_i.

The invention also proposes a current system with which a second group of parameters is associated, able to verify that it is authorized to execute software allowing implementation of the computer program and/or access to data, the computer program and/or the data having been previously coupled to a reference system with which a first group of parameters is associated, by protecting a value V0 associated with the reference system and necessary for the execution of said software, in alliance with at least one parameter of the first group of parameters, the protection of the value V0 comprising the storage of at least one data pair comprising a function g_i of at least one parameter of said group of parameters and a function h_i of the value V0. The current system comprises means for retrieving the value V0 on the basis of at least one parameter of said second group of parameters.

The means for retrieving the value V0 are advantageously devised to retrieve the function h_i of the value V0 on the basis of a function of at least one parameter of said second group of parameters, correlated with the function g_i.

The invention further proposes a computer program product comprising instructions able to implement, when it is loaded and executed on computer means, a verification that a current system with which a second group of parameters is associated is authorized to execute software allowing implementation of a computer program and/or access to data, the computer program and/or the data having been previously coupled to a reference system with which a first group of parameters is associated, by protecting a value V0 associated with the reference system and necessary for the execution of said software, in alliance with at least one parameter of the first group of parameters, the protection of the value V0 comprising the storage of at least one data pair comprising a function g_i of at least one parameter of said group of parameters and a function h_i of the value V0. The verification comprises the fact of retrieving the value V0 on the basis of at least one parameter of said second group of parameters.

Retrieving the value V0 can advantageously comprise retrieving the function h_i of the value V0 on the basis of a function of at least one parameter of said second group of parameters, correlated with the function g_i.

DESCRIPTION OF PREFERRED EMBODIMENTS

Figure 1:
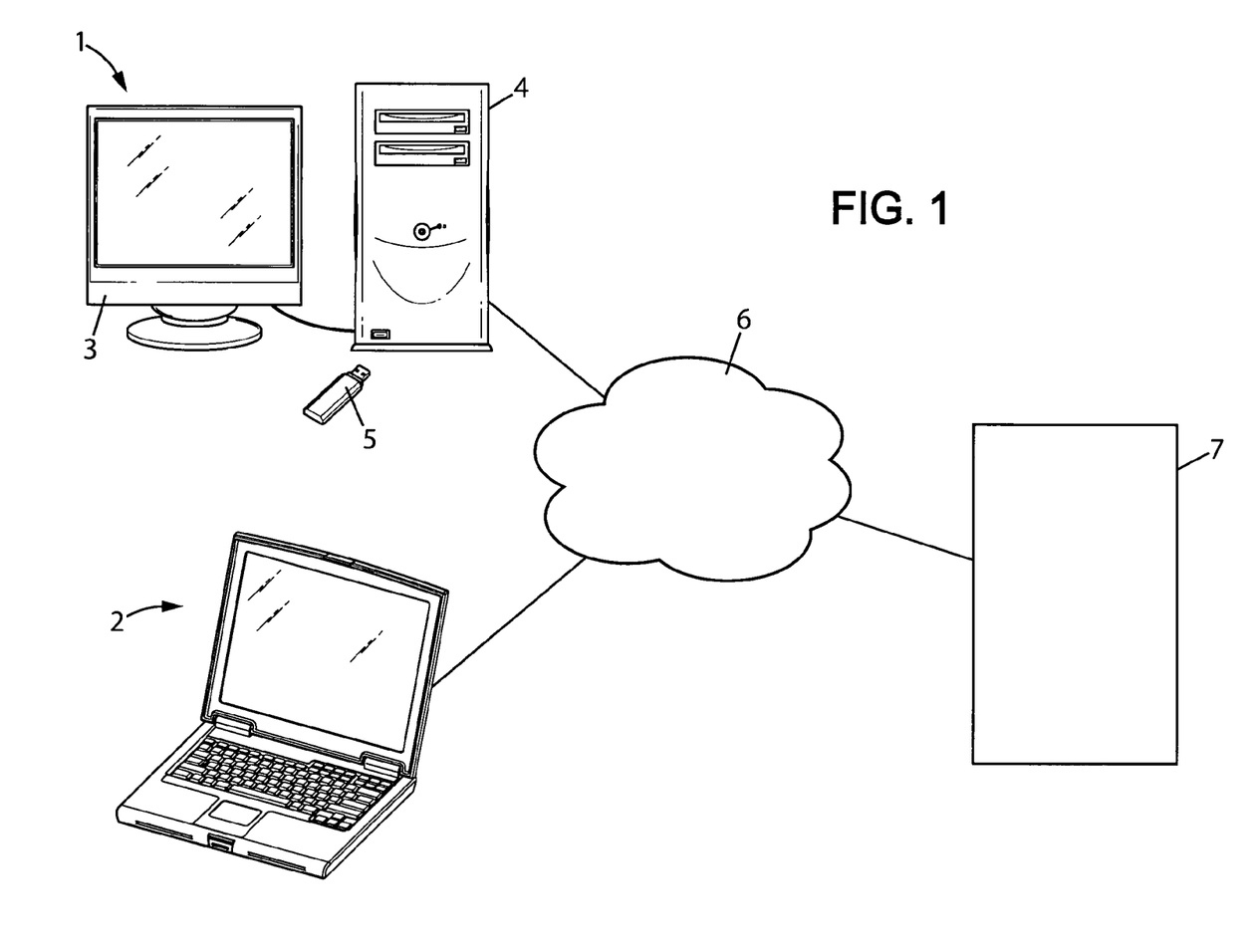
FIG. 1 is a diagram representing an example of systems in relation to which the invention can be implemented.

FIG. 1 shows a reference system 1, which, in the example illustrated, is a computer comprising in particular a screen 3, a central unit 4 and possibly peripherals, such as a removable memory 5 (USB key, memory card, etc.).

This reference system 1 is commonly used by a user having legitimately acquired a computer program and/or data. It is to this reference system 1 that said computer program and/or said data will be coupled according to the present invention. Stated otherwise, it is for this reference system 1 that the execution of the software allowing the implementation of said computer program and/or the fact of accessing said data will be reserved.

It will be understood that the reference system 1 may have forms other than that represented in FIG. 1. It may in particular involve any type of terminal, such as a portable computer, a mobile telephone, a digital personal assistant, etc. It may also involve a complex information system comprising a set of distinct but inter-cooperating machines.

FIG. 1 also shows a current system 2 which will be detailed subsequently, and which, in the example illustrated, has been represented in the form of a portable computer. Here again, the current system 2 may be any type of terminal or information system, as for the reference system 1. As will subsequently be apparent, the current system 2 may in fact actually be the reference system 1 itself.

Finally, FIG. 1 shows a remote server 7 comprising calculation and/or storage means and which may possibly be used to implement all or some of the operations implemented within the framework of the present invention. When it is used, this remote server 7 is advantageously connected to the reference system 1 and/or current system 2, for example by way of a communication network 6.

That said, the invention could be carried out without the use of the remote server 7, thereby having the advantage of not requiring any transmission of information outside of the reference system 1 and/or of the current system 2, especially when the network 6 linking these various entities is not effectively secured.

According to a first aspect of the invention relating to the coupling, the computer program and/or the data, whose implementation or access is ensured by executing software, are coupled to the reference system 1 by protecting a value V0 associated with the reference system 1 and necessary for the execution of said software, in alliance with at least one parameter of a group of parameters P1, P2, . . . , Pn associated with the reference system 1.

Figure 2:
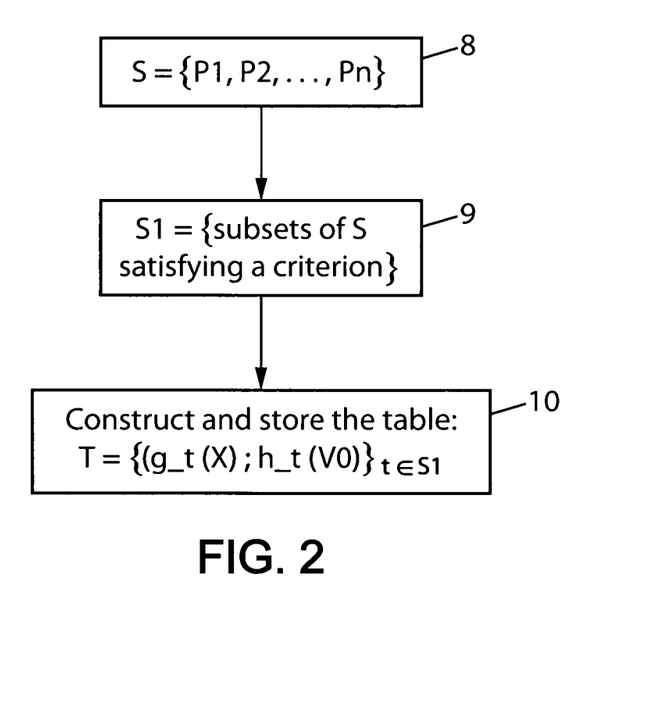
FIG. 2 is a flowchart showing coupling steps according to the invention.

FIG. 2 shows an example of steps that can be implemented within the framework of this coupling.

Each of the parameters P1, P2, . . . , Pn relates to the reference system 1. Some of them may for example relate to the configuration of the reference system 1. In particular, certain parameters may correspond to elements of the reference system 1.

It is possible for example to cite the following parameters: a serial number of a hard disk, a serial number of a processor, a password of the regular user of the reference system, a register base, a memory size (RAM, ROM, graphics memory, etc.), a response time of the reference system (processor, network connection, etc.), an encryption/decryption key stored on the reference system or on a removable peripheral, a field created during the coupling, an address of the reference system, etc.

A procedure for homogenizing the parameters may possibly be used, for the sake of simplification, so that P1, P2, . . . , Pn belong to the same representation space. This makes it possible to have a uniform coding format for each of the parameters, and this may be achieved for example with the aid of hash functions applied to some of the parameters.

The parameter group associated with the reference system 1 thus forms a set S={P1, P2, . . . , Pn} (step 8). This set S can be predefined. It can for example be stored initially on the reference system 1. This is however not recommended, since an attacker having access to the reference system 1 could modify the corresponding file. Preferably, this set S can be constructed for example by interrogating the elements corresponding to the parameters.

This set S can be viewed as a set characteristic of the reference system 1 at a given instant.

A set S1 can be defined on the basis of S, as a set of subsets of S satisfying a predetermined criterion (step 9). The criterion in question may be diverse.

For example, S1 can contain all the subsets of S having at least p elements, with p<n. Thus, by way of illustration, if n=4 and p=3, S1 comprises the following subsets of S: {P1, P2, P3}, {P1, P2, P4}, {P1, P3, P4}, {P2, P3, P4} and {P1, P2, P3, P4}.

If p=1, S1 consists of the subsets corresponding to each of the parameters P1, P2, . . . , Pn taken individually. Conversely, if p=n, the set S1 coincides with the set S={P1, P2, . . . , Pn}.

According to another example, S1 might contain the subsets of S defined by certain logic combinations, for example all the subsets of S containing P1 and (P2 or P4). S1 might thus contain only part of the parameters of S, the other parameters of S being excluded therefrom.

Of course, any other criterion may also be envisaged.

As will be discussed subsequently, when the coupling has been carried out as indicated above, the verification of the legitimacy of the current system 2 depends on the definition of the set S1 and therefore the criterion satisfied by the subsets of S included in S1. This results in some flexibility, since the verification can culminate positively even when certain parameters of the reference system 1 and of the current system 2 differ, provided that others (grouped together in S1) are identical.

The criterion satisfied by the subsets of S included in S1 can thus be chosen precisely according to the desired flexibility level. In particular, S1 can be chosen, according to the criterion adopted, so as to authorize a determined number of changes of configuration of the reference system.

A table T can thereafter be constructed in the following manner (step 10): for any element t of S1, a data pair $(g\_t(X); h\_t(V0))$ is determined. Advantageously, $g\_i$ denotes a function dependent on i, $h\_i$ denotes an invertible, bijective function dependent on i, and X denotes an element in the defining set of $g\_t$. X may possibly be chosen in an arbitrary manner or else be predetermined.

Thus, in the example mentioned above, where SI comprises the following subsets of S: {P1, P2, P3}, {P1, P2, P4}, {P1, P3, P4}, {P2, P3, P4} and {P1, P2, P3, P4}, a table T comprising five data pairs $(g\_t(X); h\_t(V0))$ is obtained. Likewise, in an example where S1 were to comprise only the parameter P1 for example, a single data pair would be obtained.

Advantageously, the inversion of the function $h\_i$ is relatively difficult. Moreover, the functions $g\_i$ and $h\_i$ are relatively complex (in particular by comparison with logic operators "if", "and", "or", etc.). This makes their reverse engineering time consuming and laborious, especially if software protection is called upon.

Therefore, in the table T, the value V0 associated with the reference system 1 is concealed and therefore protected by applying the function $h\_t$, while still remaining associated with certain parameters of the reference system 1.

More generally, it will be noted that the construction of the table T is such that it does not allow an attacker to easily override the coupling to the reference system 1.

It is noted that the construction of the table T can be carried out entirely by the reference system 1. As a variant, it can be done by the remote server 7 illustrated in FIG. 1. In the latter case, the remote server has knowledge of the set S1, which has for example been communicated to it previously by the reference system 1. According to yet another variant, the construction of the table T can result from the joint action of the reference system 1 and the remote server 7.

The table T is furthermore stored (step 10). This storage is advantageously performed on the reference system 1. It can however also be done wholly or partly at the level of the remote server 7 for example.

It is noted that all or part of the coupling operations described above can be done with the aid of a computer program comprising appropriate instructions. This computer program is loaded and executed on computer means, for example on the reference system 1 itself, on the remote server 7, or else in a distributed manner between these two entities for example.

According to another aspect of the invention, relating to the verification that a current system 2 is authorized to execute the software allowing implementation of the computer program and/or access to the data, the value V0 is retrieved on the basis of at least one parameter of a second group of parameters P'1, P'2, . . . , P'n associated with the current system 2.

Figure 3:
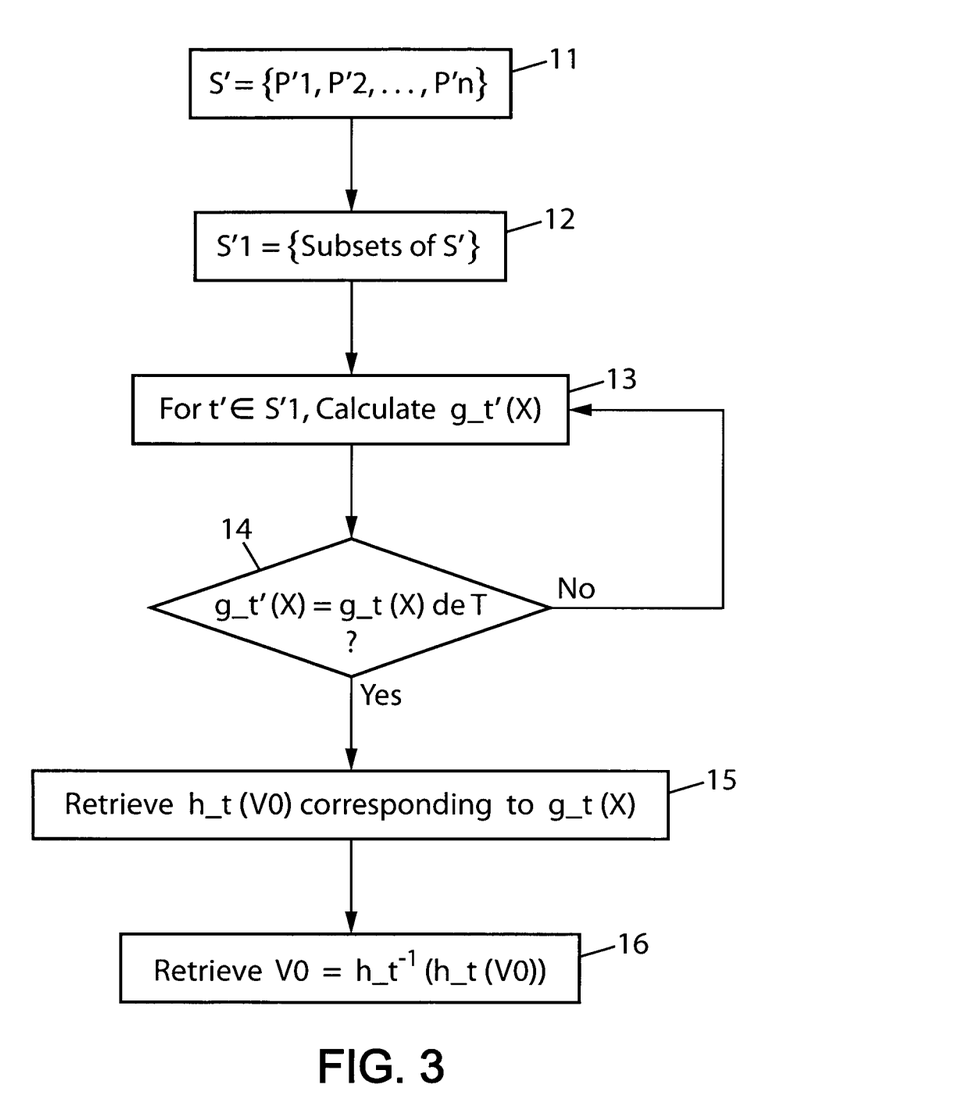
FIG. 3 is a flowchart showing verification steps according to an embodiment of the invention.
Figure 4:
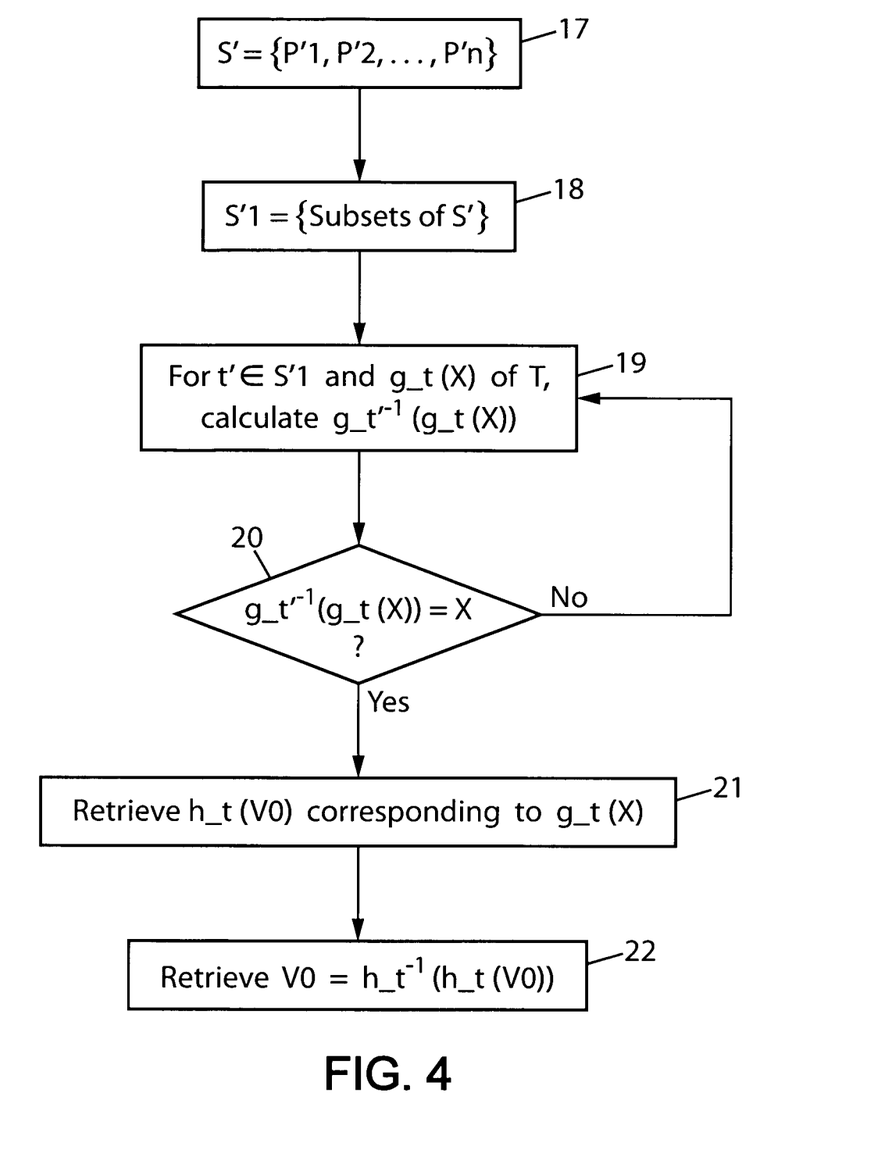
FIG. 4 is a flowchart showing verification steps according to another embodiment of the invention.

FIGS. 3 and 4 show exemplary embodiment variants of a verification. The steps appearing therein are carried out upstream of a possible execution of the software.

The case where a user wishes to obtain the execution of the software reserved for the reference system 1 from a current system 2 is thus henceforth considered. It is possible to consider that if the current system 2 is different from the reference system 1, as in the case illustrated in FIG. 1, the user in question is probably illegitimate, so that he must not be able to execute the software. Conversely, if the current system 2 is the same as the reference system 1, it is possible to imagine that this user is legitimate and it must be made possible for him to execute the software.

Subsequently in the description, one speaks of the current system 2 without prejudging the fact that it is identical or different from the reference system.

FIG. 3 is referred to henceforth. The exemplary verification shown therein follows on from the exemplary coupling described earlier with reference to FIG. 2. The mode of verification is of course adapted as a function of the previously performed mode of coupling.

The group of parameters P'1, P'2, . . . , P'n associated with the current system 2 forms a set S'={P'1, P'2, . . . , P'n} (step 11).

These parameters are of the same type as the parameters P1, P2, . . . , Pn relating to the reference system 1. They correspond for example to the same elements as the parameters P1, P2, . . . , Pn. In this way, if at the time of verification, the current system 2 is in all respects identical to the reference system 1 such as it was at the time of coupling, we have P'1=P1, P'2=P2, . . . , P'n=Pn.

The set S' can be predefined. It can for example be stored initially on the current system 2. Preferably, this set S' can be constructed for example by interrogating the elements corresponding to the parameters.

A set S'1 can be defined on the basis of S', as a set of subsets of S' (step 12). If, during the verification, the set S1 defined in step 9 is known, S'1 can then be chosen to correspond to S1. In this case, S'1 comprises the same subsets of S' as S1 of S. Stated otherwise, the subsets included in S'1 satisfy the same predetermined criterion as those included in S1.

In the converse case, S'1 can be defined differently from S1. For example, S'1 can comprise the set of the subsets of S', without consideration of a predetermined criterion.

For at least certain elements t' of S'1, we then calculate $g\_t'(X)$, with the aid of the function $g\_i$ and of the element X that were mentioned above (step 13). The elements t' can for example run through the set S'1 beginning with the subsets containing the most parameters and ending with the subsets containing the fewest parameters. Other strategies for running through the set S'1 can of course be envisaged.

The value $g\_t'(X)$ thus obtained is thereafter compared with certain at least of the values $g\_t(X)$ stored in the table T (step 14). This assumes of course that the table T is accessible from the current system 2, either because it is stored on the current system 2 (in particular if the current system 2 is the same as the reference system 1), or because it is made accessible for example by way of the remote server 7 on which it is stored.

There are diverse ways to run through the table T. The value $g\_t'(X)$ considered can for example be compared with the values $g\_t(X)$ stored in the table T in increasing or decreasing order of these values $g\_t(X)$, or in the order of classification of the values $g\_t(X)$ in the table T. It will be noted however that an arbitrary order of comparison could also be suitable.

When the value $g\_t'(X)$ considered agrees with one of the values $g\_t(X)$ of the table T, this indicates an equality between t and t', that is to say an identity between certain subsets of parameters of the reference system 1 and of the current system 2.

In this case, the value $h\_t(V0)$ stored in the table T in correspondence with this value $g\_t(X)$ (step 15) is retrieved. Then, the value V0 is retrieved by applying the inverse function of $h\_t$ to the value $h\_t(V0)$ retrieved (step 16).

The current system 2 thus obtains the value V0 associated with the reference system 1 and necessary for the execution of the software. This amounts to authorizing the user of this current system 2 to execute the software, because it is considered that the current system 2 coincides sufficiently well with the reference system 1.

The fact that t and t' can denote a subset containing a lower number of parameters than n affords the flexibility mentioned above. Specifically, a change of configuration of the reference system 1, for example involving the modification of one or more parameters P1, P2, . . . , Pn, will still not prevent its legitimate user from executing the software, the current system 2 being nevertheless recognized as being the reference system 1.

As mentioned above, it is understood that the definition of the set S1, on the basis of a predetermined criterion for example, plays a significant role in this flexibility.

If, in contradistinction to what was described above, no value $g\_t(X)$ of the table T agrees with the value $g\_t'(X)$ considered in step 14, another element t' of S'1 is selected so as to calculate a new value $g\_t'(X)$ (step 13).

If, having run through the whole of the set S'1, it has not been possible to identify an agreement between a value $g\_t'(X)$ and a value $g\_t(X)$ of the table T, it can then be concluded that the current system 2 and the reference system 1 are distinct, since these two systems comprise too many different parameters according to the predetermined criterion.

In this case, no access to a value $h\_t(V0)$ is given, and the value V0 is not made accessible. Therefore, the execution of the software cannot take place on the current system 2.

The reserving of the execution of the software for the reference system 1 is thus ensured in this example.

The exemplary verification illustrated in FIG. 4 comprises steps 17 and 18 that are identical to steps 11 and 12 of FIG. 3. In this exemplary embodiment, the function $g\_i$ is invertible and bijective. Advantageously, the inversion of $g\_i$ is relatively difficult.

In step 19, the value $g\_t'-1(g\_t(X))$ is calculated for at least certain elements t' of S'1 and certain at least of the values $g\_t(X)$ stored in the table T, $g\_t'-1$ denoting the function inverse to $g\_t'$, which is a function correlated with $g\_t'$. The manner in which t' runs through S'1 and the manner of running through the values $g\_t(X)$ of the table T may be similar to what was described above with reference to FIG. 3.

The value $g\_t'-1(g\_t(X))$ thus calculated is then compared with the element X defined above (step 20).

In the event of agreement, which indicates an equality between t and t', the value $h\_t(V0)$ stored in the table T in correspondence with the value $g\_t(X)$ used in the expression $g\_t'-1(g\_t(X))$ (step 21) is retrieved. Then, the value V0 is retrieved by applying the inverse function of $h\_t$ to the value $h\_t(V0)$ retrieved (step 22). These steps 21-22 correspond substantially to steps 15-16 described earlier with reference to FIG. 3.

If, in contrast to what was described above, the value $g\_t'-1(g\_t(X))$ considered in step 20 does not agree with the element X, another element t' of S'1 is selected so as to calculate a new value $g\_t'-1(g\_t(X))$ (step 19).

If, having run through the whole of the set S'1, it has not been possible to identify an agreement between a value $g\_t'-1(g\_t(X))$ and the element X, it can then be concluded that the current system 2 and the reference system 1 are distinct, since these two systems comprise too many different parameters according to the predetermined criterion.

It will be noted that the calculation steps described with reference to steps 13-16 and 19-22 can be carried out either by the current system 2, or by the remote server 7 for example, or in a distributed manner between these entities.

Additionally, the verification could possibly be carried out according to variants other than those described with reference to FIGS. 3 and 4, provided that they make it possible to retrieve the value V0 on the basis of the table T.

For example, in a slightly more general manner than in the preceding examples, when the previous coupling of the computer program and/or of the data to the reference system 1 comprises the storage of at least one data pair comprising a function $g\_i$ of at least one parameter of said first group of parameters and a function $h\_i$ of the value V0, the verification can then comprise retrieving the function $h\_i$ of the value V0 on the basis of a function of at least one parameter of the group of parameters P'1, P'2, . . . , P'n correlated with the function $g\_i$.

It is noted that all or some of the verification operations described above can be done with the aid of a computer program comprising appropriate instructions. This computer program is loaded and executed on computer means, for example on the current system 2 itself, on the remote server 7, or else in a distributed manner between these two entities for example.

When the current system 2 has obtained V0, it is then capable of executing the software allowing implementation of the computer program and/or access to the data desired.

V0 can for example constitute a decryption key used in combination with a decryption algorithm f for decrypting a set of instructions of said computer program and/or certain at least of said data to which access is desired.

Even if the decryption algorithm f were known by third parties, it advantageously comprises cryptographic properties which prevent the third parties from retrieving V0, even by an exhaustive search.

A decryption, even performed with the right algorithm f, but with a different key from V0, cannot succeed.

In another example relating to the case where the user of the current system 2 wishes to implement a computer program, the value V0 can for example represent a jump value (offset) in the code of the computer program, so as to point to the first instructions allowing its implementation. Conversely, a jump carried out in the code of the computer program with a different value from V0 will not allow correct implementation of this program.

Other examples can of course be envisaged, provided that only the knowledge of the right value V0 allows correct execution of the software. In general, although not compulsory, the correct execution of the software is carried out with the aid of a function of which V0 constitutes an input value, as is the case in the example of the decryption algorithm f mentioned above. This function can be present initially in the software or else be added thereto, including in the form of an external module provisionally linked to the current system 2.

Preferably, the value V0 used is specific to the reference system 1, that is to say another system will have an associated value V0', different from V0. This makes it possible to increase resistance to attacks. Specifically, an attacker having had access to the value V0' associated with another system, will not be able to use it to execute the software on the reference system 1.

In an advantageous manner, when it is used, the table T can be updated in relation to the reference system 1 after the initial coupling. This update can be triggered for example in a periodic manner, on expiry of a delay (timer), when a counter relating to the execution of the software reaches a determined threshold, when a modification of one of the parameters P1, P2, . . . , Pn has been detected, etc.

The updating of the table T can consist of a new generation of the table according to the same process as during the initial coupling or else according to a different process. For example, the remote server 7 can perform the updating of the table T, while the initialization of the latter had been done by the reference system 1.

This possibility of updating affords additional flexibility, insofar as it can make it possible to tolerate more changes relating to the reference system 1, such as changes of configuration. In this way, the execution of the software is still possible despite a progressive modification of the configuration of the reference system 1, for example because of the fact that a few worn-out elements are changed as the reference system 1 ages.

In an illustrative and nonlimiting example, described while adopting the notation introduced earlier, the functions g_i and h_i are symmetric encryption algorithms, such as AES (Advanced Encryption Standard) for example, using as encryption key a hash of the variable i carried out with the aid of a hash function. This hash function can for example be the SHA-1 function described in the standard FIPS 180-1, "Secure hash standard", published in April 1993 by the body Federal Information Processing Standards, and which produces digests of 160 binary elements. Of course other hash functions are also usable. Additionally, a known data block is used in the guise of element X, for example a set of zero bytes.

The invention claimed is:

1. A method of verifying that a current system with which a second group of parameters is associated is authorized to execute software allowing implementation of a computer program and/or access to data, the computer program and/or the data having been previously coupled to a reference system with which a first group of parameters is associated, by protecting a value V0 associated with the reference system and necessary for the execution of said software, in alliance with at least one parameter of the first group of parameters the method comprising:

protecting the value V0 by constructing and storing a table;
wherein the table comprises: for each element t of a set of subsets of said first group of parameters satisfying a predetermined criterion, a data pair (g_t(X); h_t(V0)), where g_t denotes a function dependent on t, h_t denotes an invertible, bijective function dependent on t, and X denotes an element in the defining set of g_t retrieving by a processing device the value V0 on the basis of at least one parameter of said second group of parameters according to the following steps:
calculating g_t'(X), for at least certain elements t' of a set of subsets of said second group of parameters;
comparing g_t'(X) with certain at least of the data g_t(X) stored in the table; and
in the event of agreement between g_t'(X) and a data item g_t(X) stored in the table:
retrieving the value h_t(V0) stored in the table and belonging to the data pair comprising said data item g_t(X); and
applying the inverse function of h_t to h_t(V0) to retrieve the value V0 associated with the reference system.

2. The method according to claim 1, in which the protection of the value V0 is done in alliance with part only of the parameters of said group of parameters.

3. The method according to claim 1, in which the protection of the value V0 is done in alliance only with subsets of said group of parameters comprising a number of parameters that is greater than a determined value.

4. The method according to claim 1, in which the value V0 is specific to the reference system.

5. A method of verifying that a current system with which a second group of parameters is associated is authorized to execute software allowing implementation of a computer program and/or access to data, the computer program and/or the data having been previously coupled to a reference system with which a first group of parameters is associated, the method comprising:

protecting a value V0 associated with the reference system and necessary for the execution of said software, in alliance with at least one parameter of the first group of parameters, the protection of the value V0 comprising the construction and storage of a table, the table comprising, for each element t of a set of subsets of said first group of parameters satisfying a predetermined criterion, a data pair (g_t(X); h_t(V0)), where g_t denotes a function dependent on t, h_t denotes an invertible, bijective function dependent on t, and X denotes an element in the defining set of g_t, retrieving by a processing device the value V0 on the basis of at least one parameter of said second group of parameters according to the following steps:
   applying, for at least certain elements t' of a set of subsets of said second group of parameters, the inverse function of g_t' to certain at least of the data g_t(X) stored in the table;
   and in the event of agreement between the result of the application of the inverse function of g_t' to a data item g_t(X) stored in the table and the element X:
      retrieving the value h_t(V0) stored in the table and belonging to the data pair comprising said data item g_t(X); and
      applying the inverse function of h_t to h_t(V0) to retrieve the value V0 associated with the reference system.

6. A system with which a second group of parameters is associated, able to verify that it is authorized to execute software allowing implementation of the computer program and/or access to data, the computer program and/or the data having been previously coupled to a reference system with which a first group of parameters is associated the system comprising:
   means for protecting a value V0 associated with the reference system and necessary for the execution of said software, in alliance with at least one parameter of the first group of parameters, the protection of the value V0 comprising the construction and storage of a table, the table comprising, for each element t of a set of subsets of said first group of parameters satisfying a predetermined criterion, a data pair (g_t(X); h_t(V0)), where g_t denotes a function dependent on t, h_t denotes an invertible, bijective function dependent on t, and X denotes an element in the defining set of g_t;
   means for retrieving the value V0 on the basis of at least one parameter of said second group of parameters including:
      a calculator for calculating g_t'(X), for at least certain elements t' of a set of subsets of said second group of parameters;
      a comparator for comparing g_t'(X) with certain at least of the data g_t(X) stored in the table;
   and means for, in the event of agreement between g_t'(X) and a data item g_t(X) stored in the table:
      retrieving the value h_t(V0) stored in the table and belonging to the data pair comprising said data item g_t(X); and
      applying the inverse function of h_t to h_t(V0) to retrieve the value V0 associated with the reference system.

7. A computer program product comprising instructions loaded and executed on computer memory, said instructions arranged for carrying out a verification that a current system with which a second group of parameters is associated is authorized to execute software allowing implementation of a computer program and/or access to data, the computer program and/or the data having been previously coupled to a reference system with which a first group of parameters is associated said verification comprising:
   protecting a value V0 associated with the reference system and necessary for the execution of said software, in alliance with at least one parameter of the first group of parameters, the protection of the value V0 comprising the construction and storage of a table, the table comprising, for each element t of a set of subsets of said first group of parameters satisfying a predetermined criterion, a data pair (g_t(X); h_t(V0)), where g_t denotes a function dependent on t, h_t denotes an invertible, bijective function dependent on t, and X denotes an element in the defining set of g_t,
   retrieving the value V0 on the basis of at least one parameter of said second group of parameters according to the following steps:
      calculating g_t'(X), for at least certain elements t' of a set of subsets of said second group of parameters;
      comparing g_t'(X) with certain at least of the data g_t(X) stored in the table; and
   in the event of agreement between g_t'(X) and a data item g_t(X) stored in the table:
      retrieving the value h_t(V0) stored in the table and belonging to the data pair comprising said data item g_t(X); and
      applying the inverse function of h_t to h_t(V0) to retrieve the value V0 associated with the reference system.

8. A system with which a second group of parameters is associated, able to verify that it is authorized to execute software allowing implementation of the computer program and/or access to data, the computer program and/or the data having been previously coupled to a reference system with which a first group of parameters is associated the system comprising:
   means for protecting a value V0 associated with the reference system and necessary for the execution of said software, in alliance with at least one parameter of the first group of parameters, the protection of the value V0 comprising the construction and storage of a table, the table comprising, for each element t of a set of subsets of said first group of parameters satisfying a predetermined criterion, a data pair (g_t(X); h_t(V0)), where g_t denotes a function dependent on t, h_t denotes an invertible, bijective function dependent on t, and X denotes an element in the defining set of g_t;
   means for retrieving the value V0 on the basis of at least one parameter of said second group of parameters including:
      means for applying, for at least certain elements t' of a set of subsets of said second group of parameters, the inverse function of g_t' to certain at least of the data g_t(X) stored in the table;
   and means for, in the event of agreement between the result of the application of the inverse function of g_t' to a data item g_t(X) stored in the table and the element X:
      retrieving the value h_t(V0) stored in the table and belonging to the data pair comprising said data item g_t(X); and
      applying the inverse function of h_t to h_t(V0) to retrieve the value V0 associated with the reference system.

9. A computer program product comprising instructions loaded and executed on computer memory, said instructions arranged for carrying out a verification that a current system with which a second group of parameters is associated is authorized to execute software allowing implementation of a computer program and/or access to data, the computer program and/or the data having been previously coupled to a reference system with which a first group of parameters is associated, said verification comprising:
   protecting a value V0 associated with the reference system and necessary for the execution of said software, in alliance with at least one parameter of the first group of parameters, the protection of the value V0 comprising, the construction and storage of a table, the table comprising, for each element t of a set of subsets of said first group of parameters satisfying a predetermined criterion, a data pair (g_t(X); h_t(V0)), where g_t denotes a function dependent on t, h_t denotes an invertible, bijective function dependent on t, and X denotes an element in the defining set of g_t, retrieving the value V0 on the basis of at least one parameter of said second group of parameters according to the following steps:

applying, for at least certain elements t' of a set of subsets of said second group of parameters, the inverse function of g_t' to certain at least of the data g_t(X) stored in the table;

and in the event of agreement between the result of the application of the inverse function of g_t' to a data item g_t(X) stored in the table and the element X:

retrieving the value h_t(V0) stored in the table and belonging to the data pair comprising said data item g_t(X); and applying the inverse function of h_t to h_t(V0) to retrieve the value V0 associated with the reference system.

* * * * *

UNITED STATES PATENT AND TRADEMARK OFFICE
CERTIFICATE OF CORRECTION

PATENT NO. : 8,484,750 B2  
APPLICATION NO. : 12/068977  
DATED : July 9, 2013  
INVENTOR(S) : Francfort et al.

Page 1 of 1

It is certified that error appears in the above-identified patent and that said Letters Patent is hereby corrected as shown below:

In the Specification

In column 5 at line 61, Change "SI" to --S1--.

In column 7 at line 23, Change "S′ 1" to --S′1--.

In column 8 at line 37, Change "S′ 1" to --S′1--.

In the Claims

In column 11 at line 23, In Claim 6, Change "associated" to --associated,--.

In column 12 at line 24, In Claim 8, Change "associated" to --associated,--.

Signed and Sealed this  
Seventh Day of January, 2014

Margaret A. Focarino  
*Commissioner for Patents of the United States Patent and Trademark Office*